United States Patent [19]
Hoffman

[11] 3,811,837
[45] May 21, 1974

[54] METHOD OF DETERMINING ACID AND WATER IN OIL

[75] Inventor: John E. Hoffman, St. Louis, Mo.

[73] Assignee: Sporlan Valve Company, St. Louis, Mo.

[22] Filed: Dec. 30, 1970

[21] Appl. No.: 102,928

[52] U.S. Cl. .......................................... 23/230 HC
[51] Int. Cl. ............................................ G01n 31/22
[58] Field of Search ............... 23/230, 253, 230 HC; 252/408

[56] References Cited
UNITED STATES PATENTS

| | | | |
|---|---|---|---|
| 3,580,704 | 3/1966 | Pickup et al. | 23/230 R |
| 3,510,260 | 5/1970 | Krawetz et al. | 23/230 R |
| 3,615,226 | 10/1971 | Apter | 23/230 R |

Primary Examiner—Robert M. Reese

[57] ABSTRACT

A method of measuring water in used oils, comprising the steps of placing a measured volume of a test solution into a first container, the first container being of a known volume when filled to overflow; placing a measured volume of test solution into a second container; pouring the measured volume of test solution from the first container into the second container; filling the first container to overflow with the oil being tested; pouring the measured volume of oil from the first container into the second container, the second container being of a volume large enough to accommodate the measured volumes of test solutions and oil, shaking the second container, introducing an additional measured volume of oil being tested into the second container so that the resultant solution separates into two phases to indicate the percentage by volume of water in the oil. The test solution in one container is a neutralizer solution including an alkali such as sodium hydroxide or potassium hydroxide, an alcohol such as ethyl alcohol, isopropyl alcohol or methyl alcohol and a small amount of water. The test solution in the other container is an indicator solution including an aromatic hydrocarbon such as benzene or toluene, an alcohol such as ethyl alcohol, isopropyl alcohol or methyl alcohol, and an indicator such as phenol red, phenolphthalein, cresol red, bromthymol blue, congo red, chlorophenol red or orange I. The percentage of aromatic hydrocarbon by volume in the indicator solution is about two percent (2 percent) to about ninety-eight percent (98 percent) of the combined volume of aromatic hydrocarbon, alcohol and indicator.

1 Claim, No Drawings under test, depending upon the amount of aromatic hydrocarbon in the indicator solution, the second container, and the second container being of a volume

METHOD OF DETERMINING ACID AND WATER IN OIL

BACKGROUND OF THE INVENTION:

This invention relates to an acid test kit for analyzing used oils and to the method of determining the amount of acid and water in oils. Kits have been used to test oil removed from a refrigeration or air conditioning system after the system has experienced a hermetic motor burnout. In some cases, the burn-out occurs quickly and little acid is produced. In other cases, it occurs slowly and a large amount of acid is formed. Analysis of the oil after such burn-out will tell the service man if the motor burn-out was severe and if an extensive clean-up procedure is necessary. In the past, kits of this type have been large, bulky and contain many different items which require measuring and a complicated procedure to be followed by the user.

One type of test kit which has been marketed for several years, requires the user to pour out one hundred (100) ml. of solution into a mixing bottle; then filling an oil-measuring vial up to a bead on the top of the vial and dumping this oil into the indicator solution, and then adding eleven (11) drops of a neutralizer solution from a dropper bottle. By mixing the solution at this point and judging the color, an indication is given of the level of acidity. This test required four (4) different containers of large size and is modeled after an ASTM standard procedure.

Another type of acid test kit consists of four (4) vials; one is a mixing bottle, one is for indicator solution, one is for a neutralizer solution and the fourth is an oil-measuring vial. The neutralizer solution is actually contained in an ampule which must be broken in order to remove it. The solution will not pour out of the ampule and requires a tube to be inserted to permit air to enter the ampule during the pouring. This kit is small and disposable, but not convenient to use.

SUMMARY OF THE INVENTION:

The present acid test kit is used to test the degree of acidity in the oil. The kit does not measure pH, but measures the actual weight of acid per unit weight of oil. The kit can be used for routine maintenance on refrigeration and air conditioning systems in checking the acidity in oil, and for many other types of applications. Preferably, the kit can be precalibrated so that only oil with an acid number less than 0.05 (mg. KOH per g. of oil) will give satisfactory results.

The acid test kit is for one-time use and is disposable. It contains only two (2) vials of a small size and is used with a very simple procedure. In spite of this great simplification of component parts, a high degree of accuracy is obtained by the unique method of measuring the oil being tested by filling the smaller bottle up to the point of overflowing. This gives a very accurate measure of the oil. The two test solutions are accurately measured when the kit is manufactured. Accurate measurement at this stage is simple.

The acid test kit is simple to use, disposable and gives a high degree of accuracy in measuring acidity, and provides test solutions that will not deteriorate with age prior to use.

The present acid test kit comprises a test solution of a measured volume disposed in a first container, and another test solution of a measured volume in a second container, the first container being of a known volume when filled to overflow to measure the volume of oil being tested after the test solution initially placed in the first container has been placed into the second container, and the second container being of a volume large enough to accommodate the measured volumes of the test solutions, and the volume of measured oil poured from the first container into the second container.

One of the test solutions is a neutralizer solution including an alkali selected from a group consisting of sodium hydroxide and potassium hydroxide and an alcohol selected from a group consisting of ethyl alcohol, isopropyl alcohol and methyl alcohol. Solution is made by diluting 0.1 N. water solution of sodium hydroxide or potassium hydroxide with alcohol. Therefore, the final solution contains five per cent (5 percent) water. The other test solution is an indicator solution including (1) an aromatic hydrocarbon selected from a group consisting of benzene and toluene, (2) an alcohol selected from a group consisting of ethyl alcohol, isopropyl alcohol and methyl alcohol, and (3) an indicator selected from a group consisting of phenol red, phenolphthlein, cresol red, bromthymol blue, congo red, chlorophenol and orange I. The percentage of aromatic hydrocarbon by volume in the indicator solution is from about two per cent (2 percent) to about ninety-eight per cent (98 percent) of the combined volume of aromatic hydrocarbon, alcohol and indicator.

Under some circumstances, depending upon the amount of aromatic hydrocarbon in the indicator solution, certain oils will separate and form two phases when tested. One can judge the acidity of such a sample by judging the color of the upper solvent layer. While this is satisfactory, it is more desirable to keep the resultant solution in a single phase. To accomplish this, the percentage of aromatic hydrocarbon by volume in the indicator solution must be high enough to maintain the oil in a single phase solution. The tendency to form two phases varies somewhat with the type of oil. The tendency to separate into two phases increases as the per cent (percent) of aromatic hydrocarbon decreases, and two phases generally result when the percentage is less than sixty per cent (60 percent). On the other hand, the percentage of alcohol by volume in the indicator solution must be high enough to hold the indicator in solution in order to provide a satisfactory color indication.

In order to avoid phase separation and maintain the indicator in solution, the percentage of aromatic hydrocarbon by volume in the indicator solution is from about sixty per cent (60 percent) to about ninety-eight per cent (98 percent) of the combined volume of aromatic hydrocarbon, alcohol and indicator. From about eighty-five per cent (85 percent) to about ninety-eight per cent (98 percent) of aromatic hydrocarbon, the indicator become increasingly insoluble. As a result, the indicator settles out to the bottom and the solution becomes lighter in color. The range of lesser desirability, which is about eighty-five per cent (85 percent) to about ninety-eight per cent (98 percent) is satisfactory to varying degrees. It is believed that above ninety-eight per cent (98 percent) of aromatic hydrocarbon, the solubility of the indicator is so low as to be unsatisfactory. In order to obtain proper miscibility with various oils to be tested and to obtain proper solubility of the color indicator, the preferred composition of the indicator solution is in the range of about sixty per cent (60 percent) to about eighty-five per cent (85 percent) aromatic hydrocarbon, the remainder being alcohol and a very small amount of indicator.

A desirable feature can be obtained by making the indicator solution with aromatic hydrocarbon at the low end of the preferred range mentioned above. An indicator solution with a relatively small amount of aromatic hydrocarbon has a limited tolerance for water in the oil being tested. If the percentage by volume of aromatic hydrocarbon in the indicator solution is low enough, and the percentage by volume of oil is high enough in the combined volume of aromatic hydrocarbon, alcohol and indicator, then the resultant solution will separate into two phases if the water in the oil excees a predetermined percentage by volume. Thus it will be understood that the acid test kit can be used to determine if excess water is in the oil.

The user can test for water as described above, or if desired, the user can test the acidity of the oil and then test for water by adding more oil to the same container and determine if phase separation occurs.

The present method of measuring acid in oil comprises the steps of placing a measured volume of a test solution into a first container, the first container being of a known volume when filled to overflow, placing a measured volume of another test solution into a second container, the test solutions being of the type previously mentioned; pouring the measured volume of test solution from the first container into the second container, filling the first container to overflow with the oil being tested; pouring the measured volume of oil from the first container into the second container, the second container being of a volume large enough to accommodate the measured volumes of test solutions and oil; shaking the second container, and judging the color of the resultant solution to determine the degree of acidity.

DESCRIPTION OF THE PREFERRED EMBODIMENT AND METHOD:

In the preferred embodiment of the acid test, the first container is a one-half ounce (½ oz.) bottle in which is placed an accurate measured volume of neutralizer solution. The neutralizer solution includes an alkali, selected from a group consisting of sodium hydroxide and potassium hydroxide. For example, the alkali can be a 0.005 normal solution of sodium hydroxide prepared by diluting a 0.10 normal water solution with a solvent selected from a group consisting of ethyl alcohol, isopropyl alcohol and methyl alcohol. This gives a solution that does not change with age.

A second container consists of a two ounce (2 oz.) bottle in which is placed an accurately measured volume of an indicator solution. The indicator solution consists of (1) an aromatic hydrocarbon selected from a group consisting of benzene and toluene, (2) an alcohol selected from a group consisting of ethyl alcohol, isopropyl alcohol and methyl alcohol, and (3) an indicator selected from a group consisting of phenol red, phenolphthalein, cresol red, bromthymol blue, congo red, chlorophenol red and orange I.

For reasons which will later appear, the acidity of the indicator solution is adjusted when manufactured so that such solution has its neutral color.

The first container is of a known volume when filled to overflow so that the volume of oil being tested can be accurately measured by anyone using the first container.

The amounts of the neutralizer solution and the indicator solution can be measured, and filled accurately and easily during manufacture of the kit. When the user gets the kit, he pours the colorless neutralizer solution from the small first container into the indicator solution, which is orange colored (the neutral color) when phenol red is used, into the larger second container. This changes the color of the mixture to purple (the alkali color). The user then fills the smaller first container up to the point of overflowing with oil to be tested. This oil is then also added to the larger second container. The bottle is then capped and shaken about fifteen (15) seconds. Then, judging the color will give an indication of the acidity of the oil. Oils with an acid number of less than 0.05 give a purple-red color which is considered satisfactory. Oils with a greater acidity give a yellow color which is considered unsatisfactory.

Because the user is aware of the neutral color (the color of the indicator solution) and is aware of the alkali color (the color of the solution upon mixing the neutralizer solution and indicator solution), the user can easily judge the resulting color when oil is added to determine acidity.

The entire kit is small enough to fit in a man's pocket. It is inexpensive enough to be expendable. The small size of the containers means less solution is used in running the test, thus further reducing the cost. In spite of the small amounts of solutions used and the small sizes of the containers, the accuracy of the test is maintained by the manner in which the oil is measured. The volume of the small first containers is very uniform, therefore by filling the first container up to the point of overflowing, a very accurate measure of the oil is obtained. This method of oil measurement is easy to communicate to the service man. There is no problem with judging the oil level with regard to the meniscus. In this way, every person using the test kit will measure the oil in an exactly identical manner. Since the other solutions can be measured accurately during manufacture, the overall result is an accurate oil analysis that is not obtainable in other ways. An additional feature of determining the water content of the oil can be obtained if the percentage of aromatic hydrocarbon is held within certain close limits.

The percentage of aromatic hydrocarbon by volume in the indicator solution can be from about two per cent (2 percent) to about ninety-eight per cent (98 percent) of the combined volume of aromatic hydrocarbon, alcohol and indicator. Above this level of about ninety-eight per cent (98 percent) aromatic hydrocarbon by volume, the indicator is insoluble. As a result, the indicator settles to the bottom and the solution becomes lighter in color. It is believed that above about ninety-eight percent (98 percent) aromatic hydrocarbon, the solubility of the indicator is so low as to be unsatisfactory. However, within the approximate range of about two per cent (2 percent) to about ninety-eight per cent (98 percent) of aromatic hydrocarbon by volume, the indicator solution will maintain a satisfactory indication color.

Under certain conditions, the resultant solution, obtained by the mixture of the neutralizer solution, indicator solution and oil being tested, will separate into two phases. When the percentage of aromatic hydrocarbon in the indicator solution is less than about sixty per cent (60 percent), certain oils will separate and form two phases when tested. The oil makes the solution milky when it is shaken, and separates to form a separate layer on the bottom when the solution is allowed to set. One can judge the acidity in such a sample by judging the color of the upper solvent layer and therefore, satisfactory results can be obtained. However, it is more desirable to avoid this phase separation by making the per cent of aromatic hydrocarbon in the indicator solution of about sixty per cent (60 percent) or more.

It has also been found that the indicator becomes increasingly insoluble in the alcohol as the percentage of aromatic hydrocarbon increases from about eighty-five per cent (85 percent) to about ninety-eight per cent (98 percent) of the combined volume of aromatic hydrocarbon, alcohol and indicator. However, again, satisfactory results can be obtained within this range of about eighty-five per cent (85 percent) to about ninety-eight per cent (98 percent) aromatic hydrocarbon and it is only above about ninety-eight per cent (98 percent) aromatic hydrocarbon that unsatisfactory results are obtained.

Therefore, in order to obtain optimum miscibility with various oils to be tested and to obtain optimum solubility of the color indicator, the preferred composition of the indicator solution is in the range of about sixty per cent (60 percent) to about eighty-five per cent (85 percent) aromatic hydrocarbon by volume, the remainder being alcohol and a very small amount of indicator. It is seen that the percentage volume of aromatic hydrocarbon and the percentage volume of oil are such as to maintain the oil in a single phase solution and to maintain the indicator in solution.

Set forth below is the composition of the old test kit described previously that uses four different containers of large size and is modeled after an ASTM standard procedure, and a specific example of the new test kit.

the oil in solution. The amount of neutralizer solution and oil used in the test must be large enough for careful measurement. When these conditions are met, the unique acid test kit provides accurate results for acidity.

Another desirable feature can be obtained by making the indicator solution with a percentage of aromatic hydrocarbon by volume at the low end of the preferred range of about sixty per cent (60 percent) to about eighty-five per cent (85 percent) aromatic hydrocarbon which is discussed previously. For example, using a preferred formula for the indicator solution as consisting of about 61.7 percent by volume benzene, about 37.8 percent by volume ethyl alcohol and about 0.5 percent of 2.5 g/l phenol red indicator, the resultant indicator solution has a limited tolerance for water in the oil being tested. If the percentage of water by volume in the oil exceeds one per cent (1 percent), then this percentage can be determined by using one and one-half times the normal amount of oil discussed previously. If the oil contains over one per cent (1 percent) water, then the solution will be milky and will separate into two separate phases after setting for several minutes. Therefore, this method can be used to determine if excess water is in the oil.

Under certain circumstances, there is certain variation in the results obtained in the water determination test described above. These variations can be attributed to additives in the oil, or variations in the viscosity of the oil being tested. A large amount of additives or a very high viscosity will cause phase separation even though the water content is below one per cent (1 percent). However, these conditions are rare and only occur outside the scope of normal interest. The test method is entirely satisfactory for all of the oils normally used in reciprocating refrigeration equipment. Since most refrigeration and air conditioning systems fall in this category, the water determination test has a braod area of application.

|  | OLD KIT | | NEW KIT | |
|---|---|---|---|---|
|  | ml. | % | ml. | % |
| Indicator | | | | |
| Phenol Red | 0.53 | 0.48 | 0.17 | 0.31 |
| (2.5 g/l solution) | | | | |
| Alcohol | 50.00 | 44.99 | 12.60 | 22.92 |
| Benzene | 50.00 | 44.99 | 20.40 | 37.12 |
| Neutralizer | 0.50 | 0.45 | 5.00 | 9.09 |
| Oil | 10.10 | 9.10 | 16.80 | 30.56 |
|  | 111.13 | 100.00 | 54.97 | 100.00 |

The above tables show and compare the amounts of various constituents used in the acid test kit solutions, along with the calculated percentage by volume of each ingredient in the solution at the time the color is judged. Comparison between the old test kit and the new test kit shows that the percentage by volume of neutralizer solution and the percentage by volume of oil has been greatly increased. This increased amount of oil is necessary so that the amount involved is large enough for accurate measurement. The high percentage by volume of oil requires a high enough percentage by volume of aromatic hydrocarbon to maintain this oil in a single phase solution.

It is apparent that the various constituents in the acid test kit must be adjusted carefully for ideal performance. The alcohol percentage must be high enough so that the indicator is held in solution. The aromatic hydrocarbon percentage must be high enough to maintain Of course, water is a contaminant in refrigeration systems and is normally not found with the oil. The test is useful on field failures where water has entered the system as a result of rupture of a heat exchange tube in a water-cooled condenser, a water chiller or other process cooler. In this particular type of failure, large amounts of water can enter the refrigeration system to contaminate the oil.

To obtain the advantage of determining a predetermined percentage volume of water in the oil, the percentage by volume of aromatic hydrocarbon in the indicator solution is low enough and the percentage by volume of oil, as measured by the first container, is high enough in the combined volume of aromatic hydrocarbon, alcohol, indicator and oil so that the resultant solution will separate into two phases when more than the predetermined percentage of water exists.

Set forth below is a specific example of the acid test kit which will also provide the additional feature of indicating a predetermined percentage of water.

|  | ml. | % |
|---|---|---|
| Indicator | | |
| Phenol Red | 0.17 | 0.26 |
| (2.5 g/l solution) | | |
| Alcohol | 12.60 | 19.88 |
| Benzene | 20.40 | 32.20 |
| Neutralizer | 5.00 | 7.89 |
| Oil | 25.20 | 39.77 |
| Total | 63.37 | 100.00 |

A comparison of the amounts of the various constituents used in this acid test kit solution and the calculated percentages by volume at the time the color is judged, with the constituents and percentages by volume of the prior art test kit shown previously in a table, again shows that the percentage by volume of neutralizer solution and the percentage by volume of oil has been greatly increased. In both cases, this increased percentage is necessary so that the amounts involved are large enough for accurate measurement. The high percentage by volume of oil requires a high enough percentage by volume of aromatic hydrocarbon to maintain the oil in a single phase solution.

The user can test for water as described above, or if desired, the user can test the acidity of the oil and then test for water by adding more oil to the same container and determine if phase separation occurs.

I claim as my invention:

1. The method of measuring water in oil, comprising the steps of:
   a. placing a measured volume of test solution into a first container,
   b. placing a measured volume of another test solution into a second container,
   c. one of the test solutions being a neutralizer solution including an alkali selected from a group consisting of sodium hydroxide, potassium hydroxide, an alcohol selected from a group consisting of ethyl alcohol, isopropyl alcohol and methyl alcohol, and water, and
   d. the other test solution being an indicator solution having a known neutral acidity color and including an aromatic hydrocarbon selected from a group consisting of benzene and toluene, an alcohol selected from a group consisting of ethyl alcohol, isopropyl alcohol and methyl alcohol, and an indicator selected from a group consisting of phenol red, phenolphthalein, cresol red, bromthymol blue, congo red, chlorophenol red and orange I,
   e. pouring the measured volume of the test solution from the first container into the second container to provide a mixture having a known alkali color that is different from the indicator solution alone,
   f. pouring a measured volume of oil into the second container with the mixtures of the test solutions, the second container being of a volume large enough to accommodate the measured volume of test solutions and oil,
   g. shaking the second container, and judging the color of the resultant single phase solution to determine whether or not the weight of acid per unit weight of oil exceeds a predetermined value by a change to a different known color,
   h. the percentage of alcohol by volume in the neutralizer solution providing a neutralizer solution sufficiently non-aqueous that the test solution mixture is miscible with the oil and phase separation does not occur when the mixture is combined with the oil, and
   i. introducing an additional, predetermined measured volume of the oil being tested into the second container so that the resultant solution separates into two phases to indicate the percentage by volume of water in the oil.

* * * * *